Patented Dec. 12, 1922.

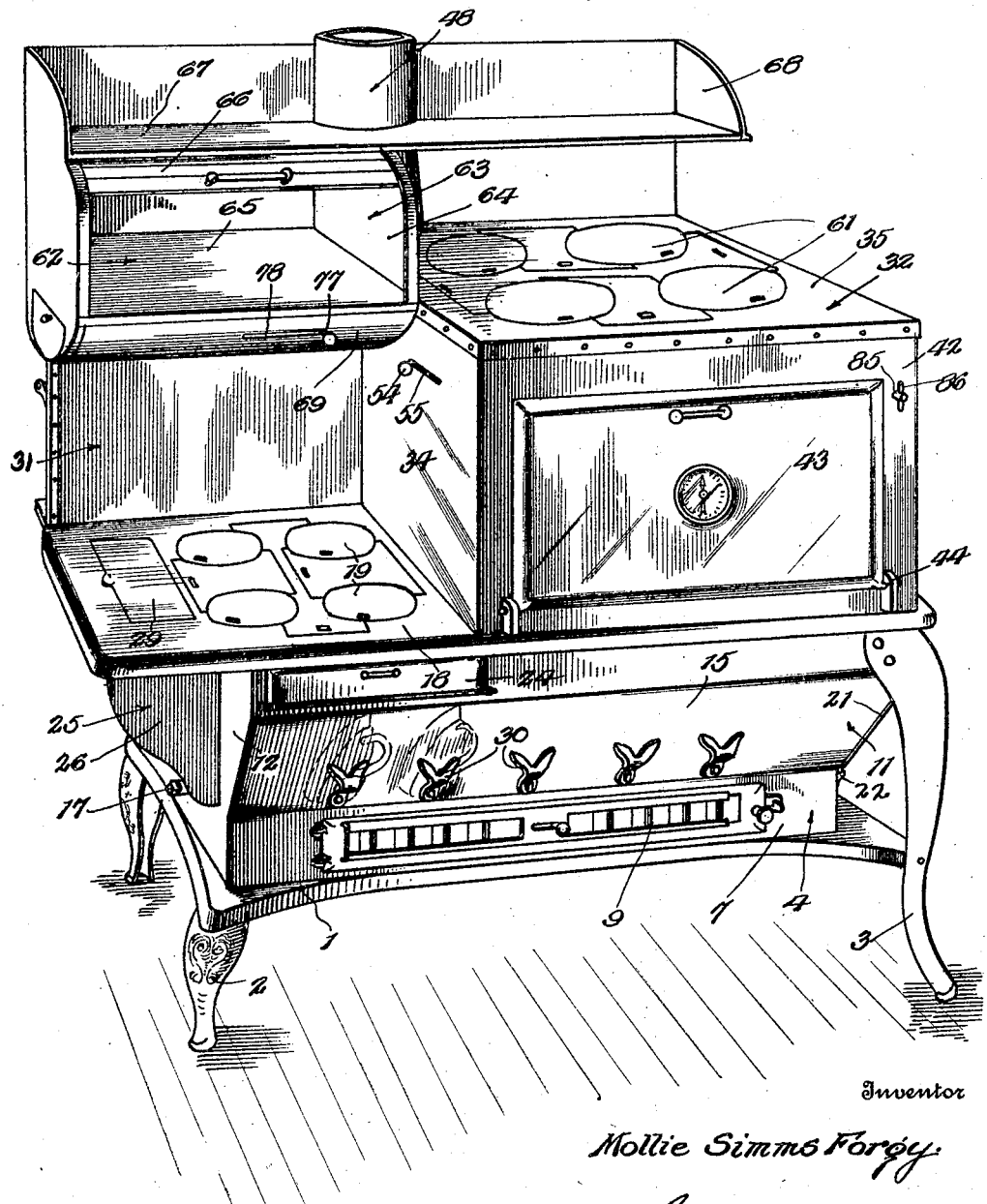

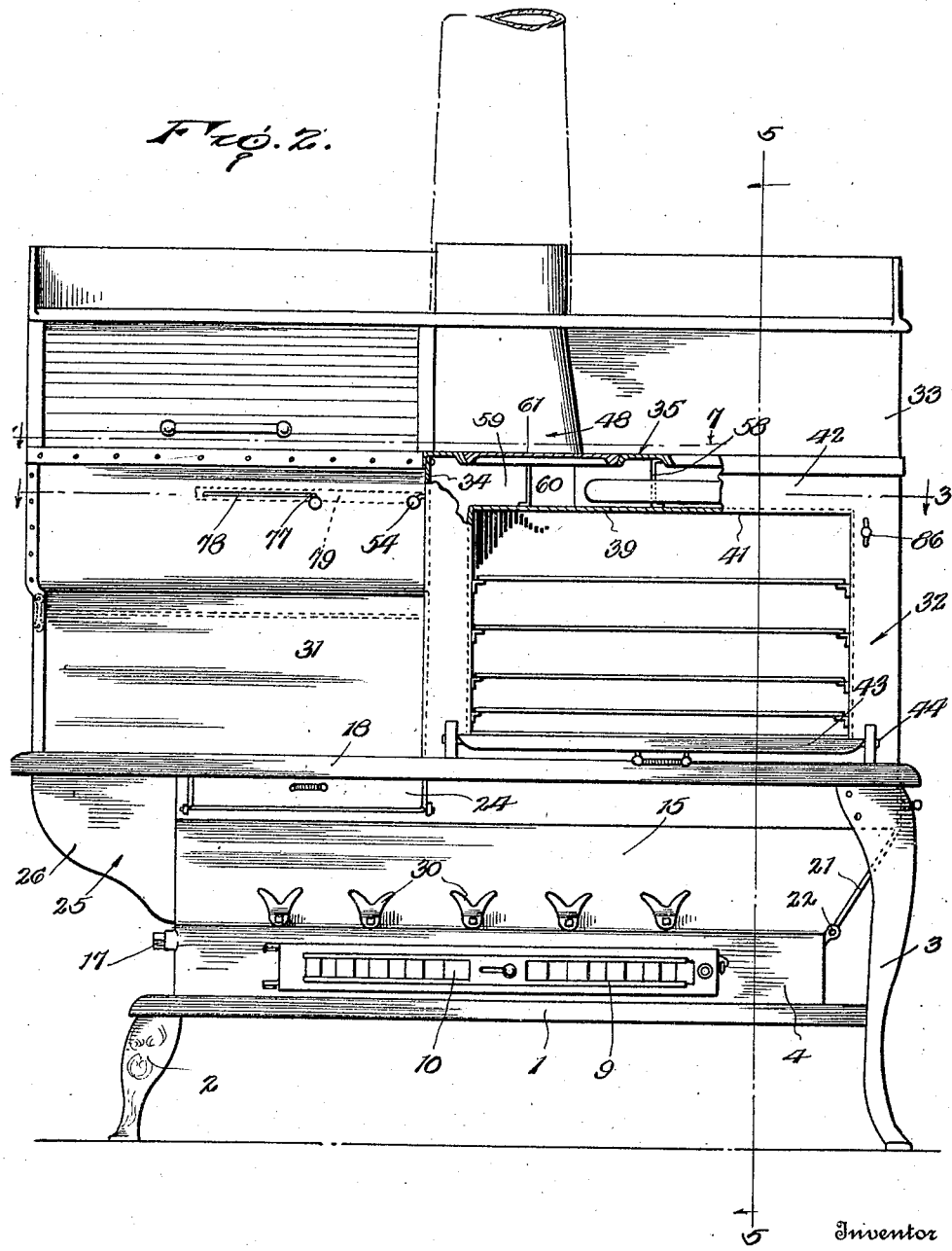

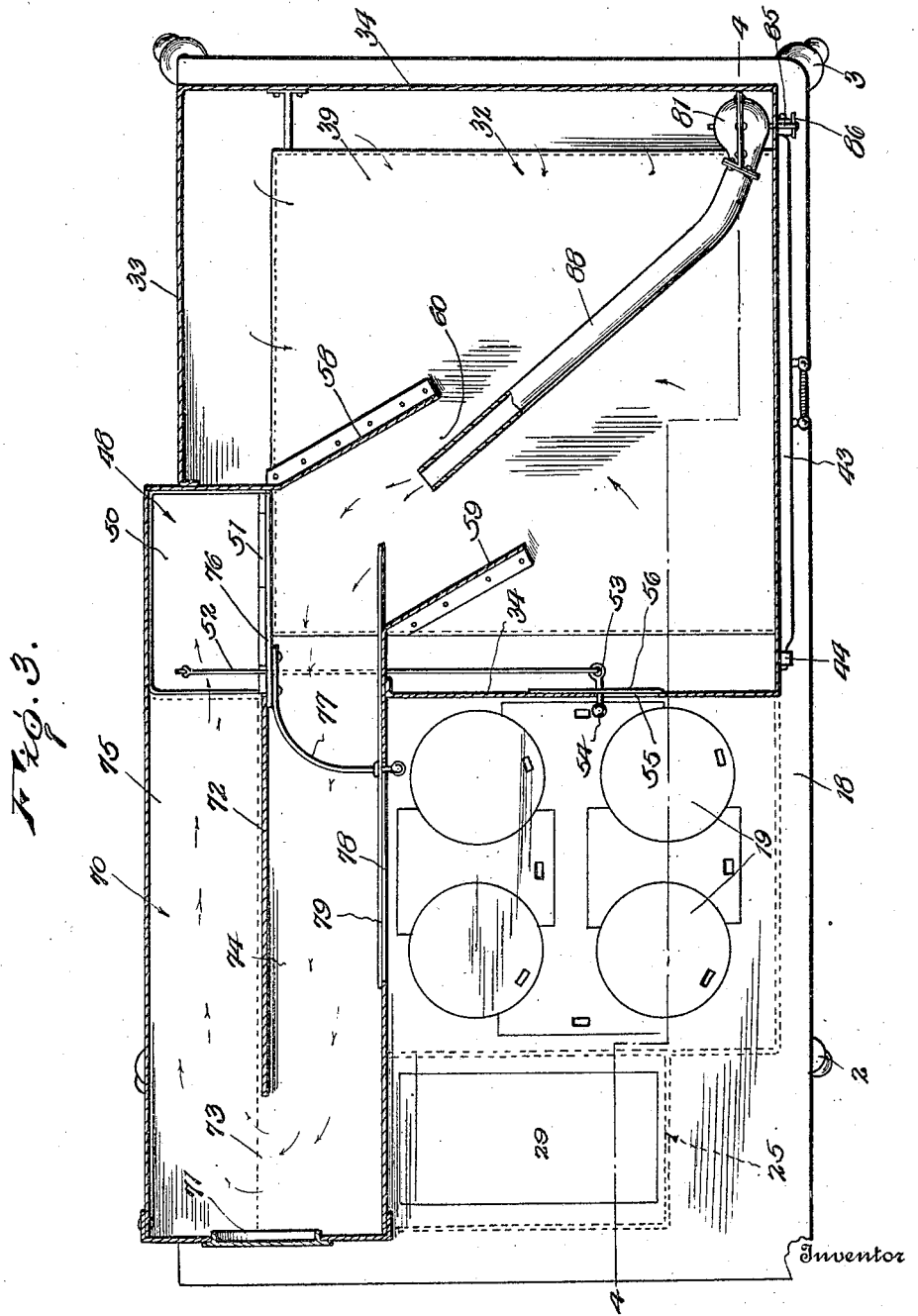

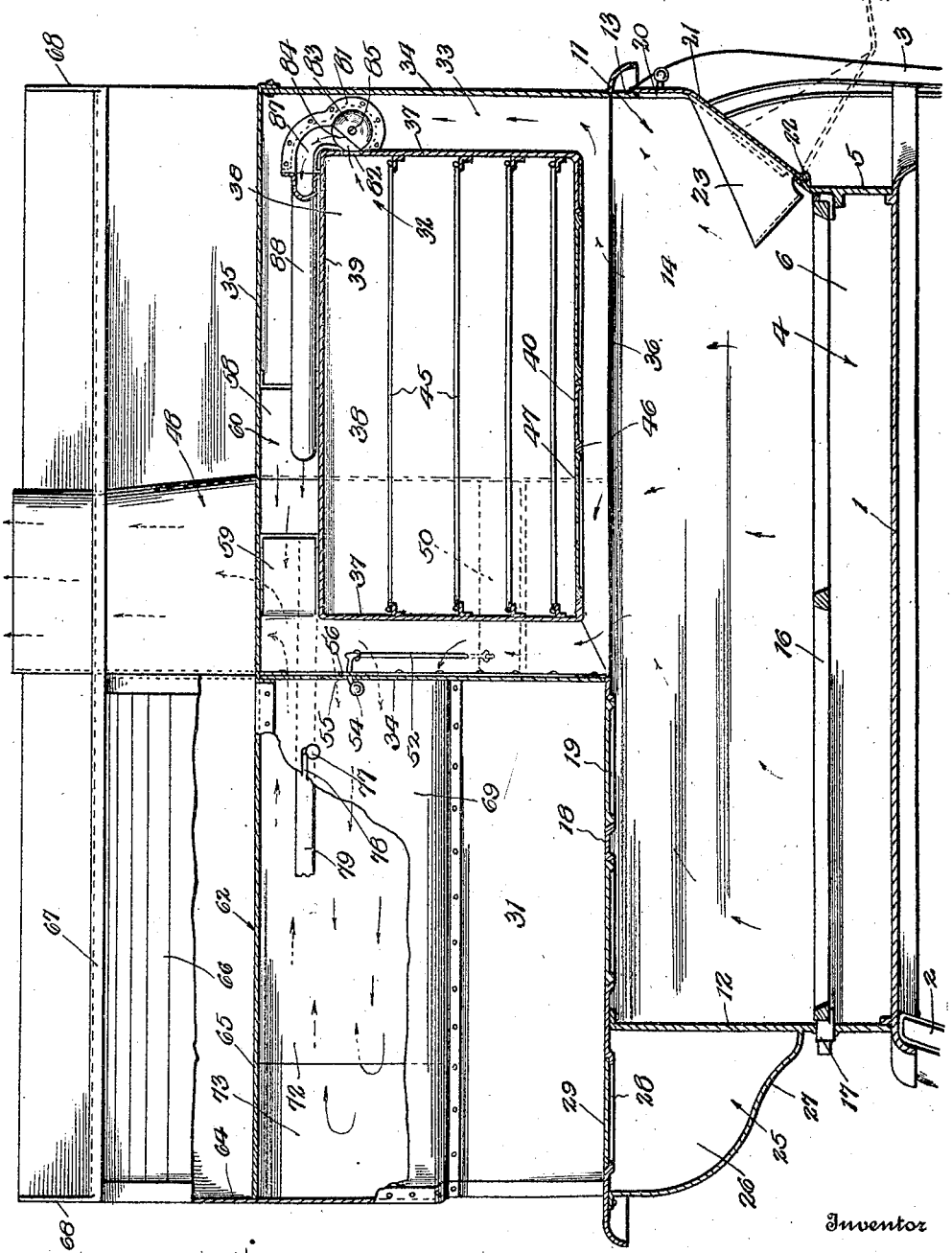

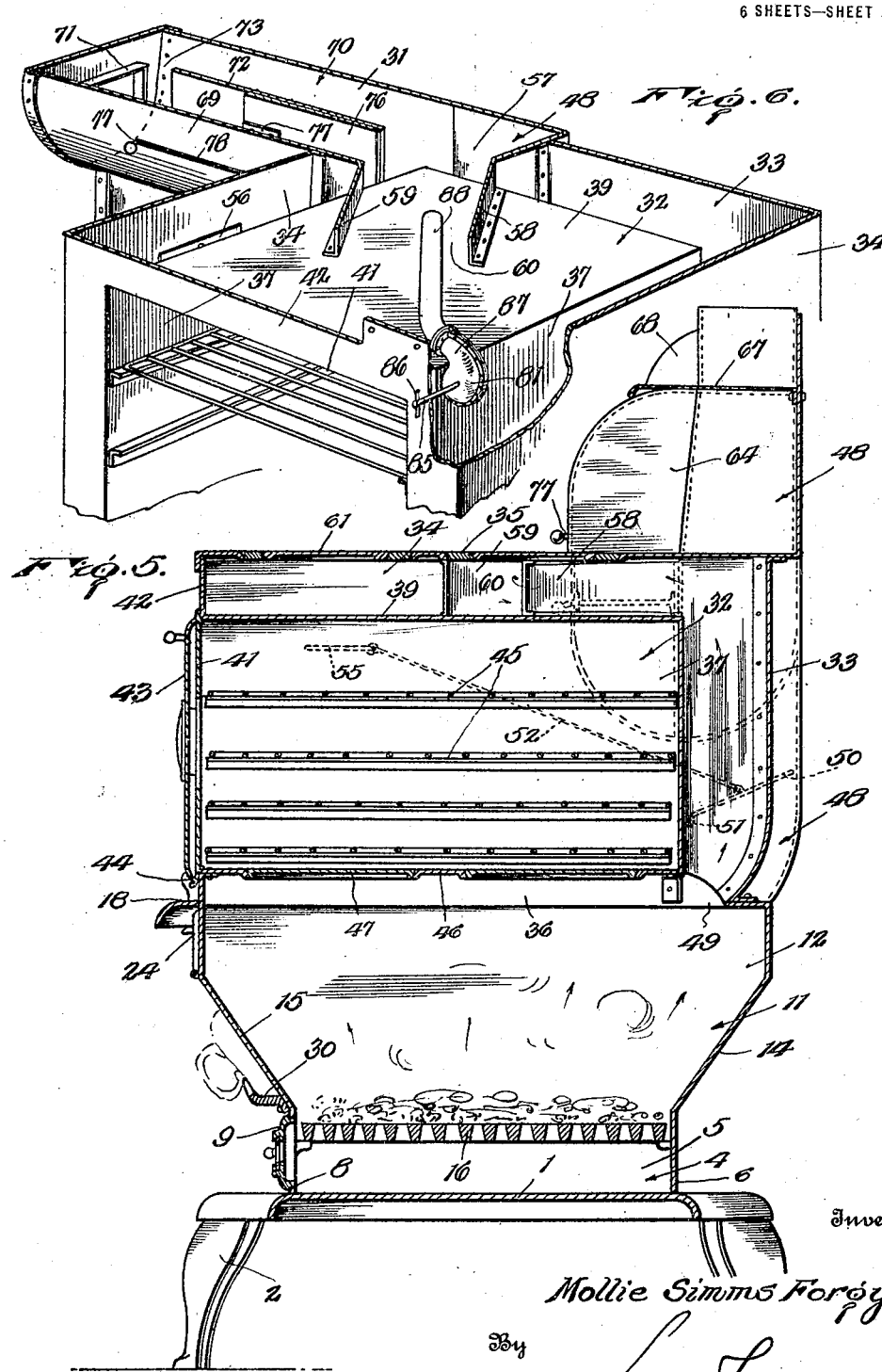

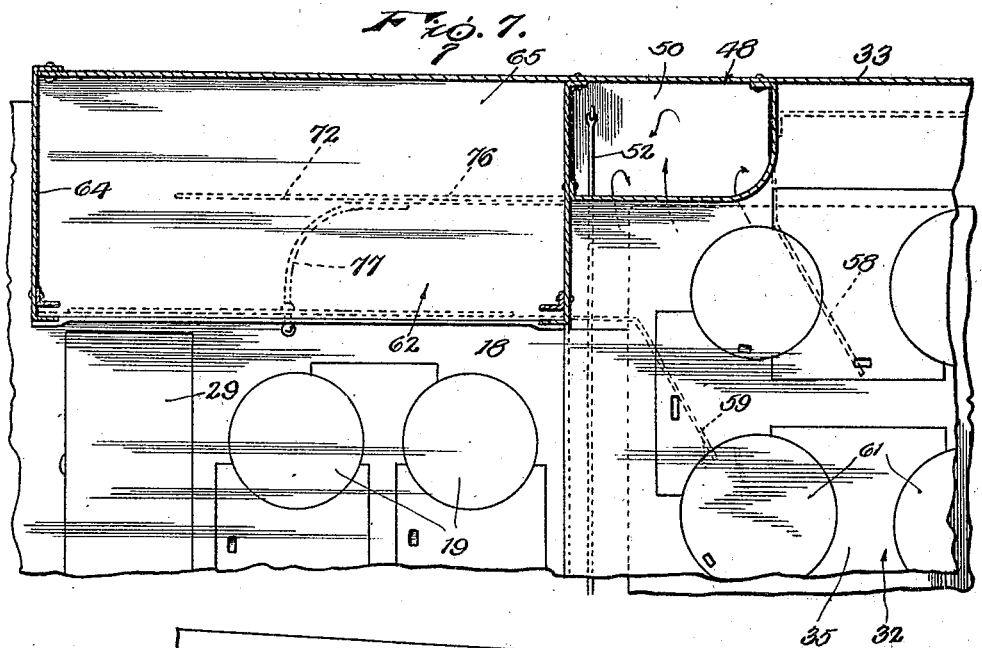
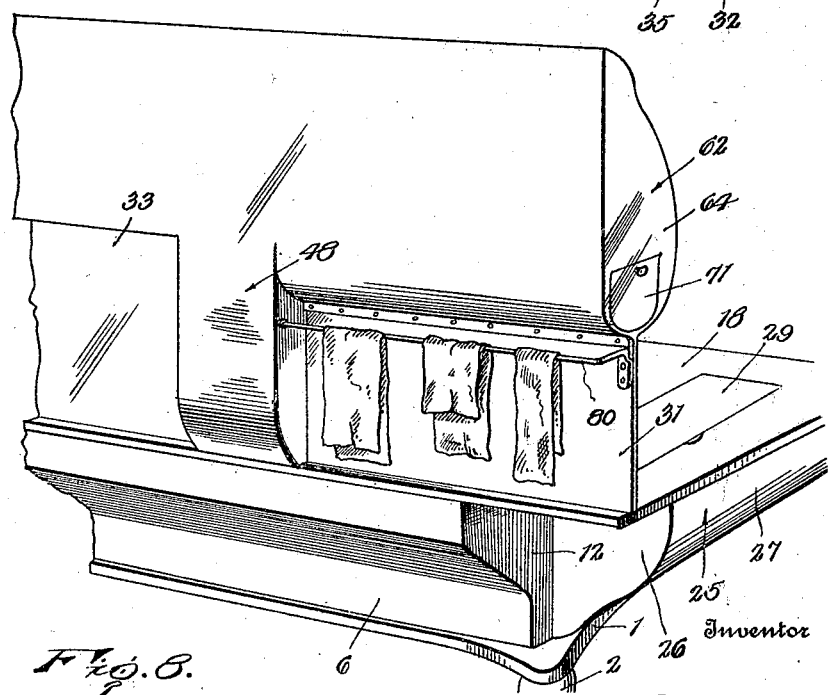

1,438,434

UNITED STATES PATENT OFFICE.

MOLLIE SIMMS FORGY, OF CENTER POINT, ARKANSAS.

COOKING RANGE.

Application filed December 14, 1920. Serial No. 430,708.

*To all whom it may concern:*

Be it known that I, MOLLIE S. FORGY, a citizen of the United States, residing at Center Point, in the county of Howard and State of Arkansas, have invented certain new and useful Improvements in Cooking Ranges, of which the following is a specification.

This invention relates to cooking ranges and has as its general object to provide a range which will have maximum capacity but which will occupy a minimum of floor space and which will possess many features presenting advantages over cooking ranges as previously constructed.

One of the more specific objects of the invention is to construct a range with a main oven which may be employed as ordinarily in roasting and baking or which may be employed in cooking various food stuffs, in which latter instance the construction presents the advantage that unpleasant odors from the food may be carried off through the flue.

Another object of the invention is to provide a range with an auxiliary oven which may be employed in warming food, raising dough, and for various other purposes, and to provide a damper arrangement whereby the heat supplied to this auxiliary oven arrangement may be controlled.

Another object of the invention is to provide a novel flue and damper arrangement for controlling the passage of heated air currents to the main oven so as to obtain the desired degree of temperature within the oven.

The invention has as a further object to provide a cooking range having a maximum surface area upon which cooking utensils may be placed so that in comparison with the floor space occupied by the range, the range will be of maximum capacity.

A still further object of the invention is to provide a range having a water reservoir from which hot water may be obtained as desired.

Still another object of the invention is to provide a range with means for the support of irons and also with a rack for tea towels, the latter so located as to insure of quick drying of the towels without the towels however being in the way of any of the utensils placed upon the range.

A further general object of the invention is to so construct the range that any desired cooking process may be carried out thereon or within its ovens, as well as any baking or roasting processes, and a great variety of food stuffs cooked simultaneously without one cooking operation interfering with another.

In the accompanying drawings:

Figure 1 is a perspective of a range constructed in accordance with the invention;

Figure 2 is a front elevation of the range, a part being broken away, and the door to the main oven being swung downwardly to open position;

Figure 3 is a horizontal sectional view taken substantially on the line 3—3 of Figure 2;

Figure 4 is a vertical longitudinal sectional view taken substantially on the line 4—4 of Figure 3;

Figure 5 is a vertical front to rear sectional view taken substantially on the line 5—5 of Figure 2;

Figure 6 is a sectional perspective view of a portion of the range;

Figure 7 is a horizontal sectional view taken substantially on the line 7—7 of Figure 2;

Figure 8 is a perspective view looking at the back of one end of the range.

The range embodying the invention comprises a base 1 which is supported upon legs 2 and 3 and which forms the bottom of the ash pit indicated by the numeral 4. The ash pit 4 comprises end walls 5, a rear wall 6 and a front wall 7, the latter wall having an opening 8 therein closed by a door 9 having the usual type of sliding damper 10. The fire box of the range is indicated in general by the numeral 11 and comprises end walls 12 and 13, a rear wall 14, and a front wall 15. The walls 14 and 15 are inclined upwardly and outwardly as is also the wall 13 while the wall 12 is preferably disposed in a vertical plane as shown in Figure 4. The fire box is divided from the ash pit by a shaking grate 16 of any ordinary construction and having a shank 17 at one end projecting through one end wall of the ash pit 4 for the application of a suitable shaker. The top of the fire box is open for a considerable portion of its area at one end but at its other end is closed by a top wall 18 provided with any suitable arrangement of openings and lids 19 as illustrated in Figures 1 and 4 of the drawings. Fuel may be introduced into the fire box by removing one or more of the lids 19 or it may be introduced through an opening 20 which is provided in the end wall 13 of the fire box. This latter opening is adapted to be closed by a door 21 hingedly mounted at its lower side, as at 22, and provided at its lateral edges with upstanding sides 23 which adapt the door to serve as a chute in drawing the fire or removing dead coals.

The fire box is also provided in the upper portion of its front wall 15 at that end of the fire box at which the top wall 18 is located, with an opening closed by a swinging door 24 through which fuel may be introduced into the fire box.

The top wall 18 of the fire box is extended laterally beyond the end wall 12, and a water reservoir 25 is provided upon the exterior of the wall 12 and comprises end walls 26 and a bottom wall 27 which is inclined or curved upwardly from the lower portion of the wall 12 to the under side of the projecting portion of the top wall 18. This reservoir is designed to contain a quantity of water which will be heated and which is made available through an opening 28 formed in the said projecting portion of the top wall 18 and normally closed by a lid 29, it being understood that the said projecting portion of the top wall 18 constitutes the top of the said reservoir.

A suitable number of brackets 30 may be provided upon the outer side of the inclined front wall 15 of the fire box to support irons in the manner illustrated in Figure 1 of the drawings and thus a number of irons may be heated simultaneously without interfering in any way with the use of the range in cooking.

The back of the range is indicated in general by the numeral 31 and extends upwardly from the rear side of the top of the fire box as best shown in Figures 1, 5 and 8 of the drawings.

The main oven of the range is indicated in general by the numeral 32, and the oven proper is enclosed within a compartment comprising a portion 33 of the back 31 of the range, end walls 34, and a top wall 35, the compartment being open at its bottom, as at 36, so as to be placed in communication with the open top of the fire box 11. The oven proper comprises end walls 37, a rear wall 38, a top wall 39, and a bottom 40, the oven having an open front 41 arranged within the front wall 42 of the enclosing compartment for the said oven, and this open front of the oven being closed by a door 43 hinged at its lower side as at 44, so that when swung down it may serve as a shelf or rest. Any suitable arrangement of shelves 45 is provided within the oven proper, these shelves being adjustable and removable as is usual in oven construction. Ordinarily the oven will be employed in the usual manner in roasting and baking, but in order that the bottom of the oven may be employed in ordinary cooking, the said bottom is provided with any suitable arrangement of openings 46 closed by removable lids 47. At this point it will be evident that the top wall 18 of the fire box constitutes a cooking top inasmuch as the flames play directly against the same and also that the bottom 40 of the oven is usable for this purpose as it too is located directly above the burning fuel in the fire box. The walls of the oven proper are suitably spaced from the corresponding walls of the compartment within which the oven is arranged and thus the heated air currents and products of combustion rising from the fire box 11 may pass around the sides of the oven with the exception of the front thereof.

The flue of the range is indicated in general by the numeral 48 and this flue is open at its bottom as at 49 to communicate with the fire box 11 at the rear side of the latter, the flue extending vertically of the back 31 of the range at the inner rear corner of the compartment within which the main oven is housed. A damper 50 is hinged at its forward side, as at 51, within the lower portion of the flue 48 at a point suitably spaced above the open lower end 49 of the flue and a rod 52 is pivotally connected at one end with this damper and extends through the forward side of the flue 48 and into the space between one of the side walls 37 of the main oven and the adjacent side wall of the compartment within which the oven is arranged. The rod is connected at its other end, as at 53, to an operating handle or knob 54 projecting slidably through a slot 55 formed in the said wall of the compartment, this slot being closed by a plate 56 which is fixed upon the handle 54 and fits against the inner face of the said side wall of the compartment, as clearly shown in Figures 3 and 4 of the drawings. By means of this handle 54, the damper 55 may be raised and lowered and when in lowered position it will extend across the flue 48 and close the same as shown in Figures 3 and 5 of the drawings, and thus cut off the direct passage of heated air currents and products of combustion from the fire box through the flue. However, when the damper is raised, there may be a direct passage of these products of combustion upwardly through the flue and out through the chimney. Even when the damper 50 is in closed position the products of combustion eventually pass out through the flue but they are caused to take a circuitous path through the space between the walls of the main oven and the compartment within which the oven is arranged and for this purpose the flue is provided in its forward side with an opening 57 which communicates with the space between the top of the main oven and the top of the compartment within which the oven is arranged. Spaced partition walls 58 and 59 extend from opposite sides of this opening in parallel relation diagonally forwardly across the top 39 of the oven and between the said top and the top wall 35 of the oven compartment, and form between them and the said walls a flue or passage 60 through which the heated air currents and products of combustion may pass to the flue 48 through the said opening 57 therein, or to the said flue indirectly as will presently be explained. It will be understood that the flue 48 is closed to the fire box 11 and the space between the walls of the main oven and the compartment within which this oven is arranged except for the open lower end 49 of the flue and the opening 57 above referred to so that in the event the damper 50 is closed, the heated air currents and products of combustion must pass upwardly about all sides of the main oven before entering the flue or passageway 60 from which they pass into the flue 48.

In order that the top 35 of the compartment 32 may be employed for cooking purposes, it is preferably provided with a suitable arrangement of lids indicated by the numeral 61.

The numeral 62 indicates in general an auxiliary or warming oven which is mounted upon the back 31 and which comprises an oven compartment 63 having end walls 64 and a bottom wall 65, the compartment being closed at its rear by the back 31 and at its front by a sliding door or one of any other suitable type, indicated by the numeral 66. The top of the oven compartment is closed by a shelf 67 which extends preferably the entire width of the back 31 and is provided with ends 68. This shelf may constitute a warming shelf or may be employed for any purpose for which it is found useful. The warming oven 62 extends across the back 31 from the left hand side of the back to the inner side wall 34 of the compartment 32. In order that heat may be supplied to the oven compartment 63, the compartment is provided below the bottom 65 with a false bottom 69 forming a heat chamber indicated in general by the numeral 70. This chamber is closed at its outer end by the respective end wall 64 of the oven compartment, which wall is extended downwardly for this purpose, a door 71 being preferably provided in this wall however so as to permit of removal of soot from the heat chamber 70. The chamber 70 is divided longitudinally by a partition wall 72 which extends from its inner end to a point spaced from its first mentioned end so as to provide in the latter instance a passage 73. The partition wall 72 divides the interior of the chamber 70 into passageways 74 and 75 which are in communication through the passage 73, and the passage 74 communicates with the opening 57 in the flue 48 whereas the passage 75 communicates with the said flue through the adjacent side thereof. The numeral 76 indicates a damper plate which is slidably mounted beside the wall 72 and is to be actuated through the shifting of an arm 77 which projects from the damper plate and through a slot 78 formed in the forward portion of the false bottom 69, this slot being closed by a plate 79 fixed upon the arm 77.

At this point it will be evident that when the damper 50 is closed and the damper 76 is open, the heated air currents and products of combustion will pass upwardly through the space between the walls of the main oven and the compartment within which the oven is arranged and finally through the passageway 60 and upwardly through the flue 48. However when the damper 76 is closed, the heated air currents and products of combustion will pass from the passageway 60 into the passageway 74, through the passage 73, and backwardly through the passage 75 before entering the flue 48. Therefore when the damper 76 is closed, the heated air currents will be caused to pass through the heat chamber for the warming oven thus supplying this oven with the required heat.

The rear side of the oven and the flue preferably project a short distance rearwardly of the back of the range as illustrated in Figure 8 of the drawings, and upon the said back, beneath the overhanging portion of the warming oven, there is preferably arranged a rack 80 upon which tea towels may be hung to dry, as shown in said figure.

In order that steam and excess heat may be permitted to escape from the oven 32 when this oven is being employed, there is provided a means which will now be described. The numeral 81 indicates a valve casing which is secured upon the end wall 37 of the oven and which is in communication with an opening 82 formed in the said end wall. The casing 81 is interiorly spherical and rotatably mounted within the casing is a substantially spherical valve 83 having a flattened side 84, the valve being adapted to be rotated through the medium of a stem 85 and handle 86 which latter is located exteriorly of the front of the compartment within which the oven is arranged, so as to occupy a position closing the opening 82 or only partly closing or completely uncovering the said opening, in which latter position of the valve the flattened side 84 thereof will be in position as shown in Figure 4 of the drawings. A tubular neck 87 leads from the upper side of the valve casing 81 and connects with one end of a pipe or flue 88 which extends diagonally across the top of the oven 32 and has its discharge end positioned between the partition walls 58 and 59, as best illustrated in Figure 3 of the drawings. It will now be understood that when the valve 83 is in open position, the draft created in the flue of the range will create a suction within the flue 88 thereby influencing passage of steam and excess heated air currents from the oven past the said valve.

Having thus described the invention, what is claimed as new is:

1. In a cooking range, a fire box, an oven compartment arranged above the fire box and open to the same at its bottom, an oven arranged within the compartment and spaced from the walls thereof, a flue having an intake opening at its lower end communicating with the fire box and having an opening communicating with the space between the top of the oven and the top of the compartment, spaced walls extending between the said top of the oven and the top of the compartment and providing a direct way between said space and the last mentioned flue opening and extending diagonally across the top of said oven, and a damper arranged within the flue between the said openings.

2. In a cooking range, a fire box, an oven compartment arranged above the fire box and open to the same at its bottom, an oven arranged within the compartment and spaced from the walls thereof, a flue communicating with the fire box and having a passage in communication with the space between the walls of the oven and the oven compartment, parallel partitions extending from said passage partly over the top of the oven between the same and the top of the oven compartment, and a vent flue in communication with the interior of the oven and leading from the same to discharge into the space between the parallel partitions.

3. In a cooking range, a fire box, an oven compartment arranged above the fire box and open to the same through the entire area of its bottom, an oven arranged within the compartment and spaced from the walls thereof, a flue communicating at its lower end with the fire box and having a passage in its front side in communication with the space between the walls of the oven and its housing compartment, parallel partitions extending from said passage partway over the oven, and a vent flue in communication with the interior of the oven at the upper front corner thereof more remote from the opening in the flue and leading diagonally over the top of the oven to discharge between said parallel partitions, and a valve in the vent flue adjacent the oven controlling the communication between the vent flue and the oven.

4. In a cooking range, an ash pit, a fire box over the ash pit, one end wall of the fire box having a lower inclined portion extending upwardly and outwardly from the ash pit and a short vertical portion rising from said inclined portion, the end wall being provided with an opening through both said portions, and a door hinged at it lower end upon the lower edge of said opening and having relatively angularly disposed portions conforming to the inclined and vertically disposed portions of the end wall, the door being further provided with upstanding sides along the side edges of its lower portion and coterminous with said portion.

5. A cooking range comprising a fire box having its top open through a portion of its area and covered through the remainder of its area, an oven compartment resting on the open portion of the top of the fire box, the entire bottom of the oven compartment being open, an oven within the oven compartment having its top, side and back walls spaced from the corresponding walls of the oven compartment, a back rising from the fire box, a warming oven supported by said back over and spaced from the covered portion of the fire box, said warming oven having its inner end abutting said oven compartment, a heat chamber on the bottom of the warming oven, a partition within the heat chamber extending longitudinally thereof from the inner end of the same and terminating short of its outer end, a vertical flue in rear of the oven compartment communicating at its lower end with the fire box and provided in one side with an opening establishing communication through the inner end of the heat chamber with the space between the back of the heat chamber and the partition therein and provided in its front with an opening establishing communication with the space between the top of the oven compartment and the top of the oven at the inner end of the heat chamber, and a damper operable from the heat chamber to cover or uncover the last-mentioned opening whereby to permit heat currents to pass from over the oven directly into the flue or direct them into the heat chamber.

In testimony whereof I affix my signature.

MOLLIE SIMMS FORGY. [L. S.]